United States Patent
Wiselogel

[11] Patent Number: 6,130,796
[45] Date of Patent: Oct. 10, 2000

[54] ADAPTIVE TRACK PITCH CONTROL METHOD AND APPARATUS FOR DISK DRIVES

[75] Inventor: Mark Thomas Wiselogel, Morgan Hill, Calif.

[73] Assignee: Seagate Technology, Inc., Scotts Valley, Calif.

[21] Appl. No.: 08/831,855

[22] Filed: Apr. 2, 1997

Related U.S. Application Data

[60] Provisional application No. 60/032,052, Nov. 25, 1996.

[51] Int. Cl.[7] ........................... G11B 21/02; G11B 5/596; G11B 27/36
[52] U.S. Cl. ........................... 360/75; 360/31; 360/77.08
[58] Field of Search .................................. 360/75, 77.08, 360/77.04, 31

[56] References Cited

U.S. PATENT DOCUMENTS

| | | | |
|---|---|---|---|
| 5,553,086 | 9/1996 | Sompel et al. | 371/47.1 |
| 5,844,742 | 12/1998 | Yarmchuk et al. | 360/77.08 |

*Primary Examiner*—Glenton B. Burgess
*Assistant Examiner*—Regina Y. Neal
*Attorney, Agent, or Firm*—Jonathan E. Olson; Shawn B. Dempster; Edward P. Heller, III

[57] ABSTRACT

A method and apparatus for manipulating a magnetic disk to provide adaptive track pitch. A manufacturing station measures the actual radial width of an annular surface of the disk, which may include extra space. Wider-than-nominal track widths are then computed and utilized for writing data onto the disk.

9 Claims, 4 Drawing Sheets

ADAPTIVE TRACK PITCH CONTROL METHOD AND APPARATUS FOR DISK DRIVES

RELATED APPLICATION

This application is related to co-pending Provisional Application Ser. No. 60/032,052, (as corrected), entitled: "ADAPTIVE CONTROL OF TRACK SPACING IN A DISK DRIVE", filed Nov. 25, 1996 by the same applicant.

TECHNICAL FIELD

The present invention relates to disk drive apparatus and methods. More particularly, the present invention relates to the disk drive's magnetic disk and methods of storing data on the magnetic disk apparatus. Even more particularly, the present invention relates to magnetic disk apparatus and methods that relate to optimum utilization of actual disk area for determining data track spacing.

BACKGROUND ART

Disk drives are apparatus comprising one or more substantially thin, magnetic disks that are rotated by a spindle motor that is responsive to the drive's control mechanism and associated electronics that communicate data via read and write heads. The disk drives are used in computer systems, such as personal computers, laptop computers and workstation equipped with computer systems, to store large amounts of data, (giga-byte range), in a form that is machine readable for subsequent use by a user. The magnetic disk comprises a surface of magnetizable material having a number of annular regions, called tracks, that extend circumferentially around the disk. Each track is divided into blocks called sectors. Data and other identification information is stored in the sectors in the form of magnetic transitions. The reading and writing of data is accomplished by read and write heads and are positioned over the required track by the drive's positioning control system. The system typically includes the use of solenoid type voice coil actuators for high resolution. The quantity of data that can be stored on a disk depends upon how much of the surface area is magnetized for the storage of a bit. Ideally, use of the entire disk surface for writing data is a desirable objective. However, the ideal objective is not yet possible. Traditionally, the data tracks are written at a fixed nominal spacing based on a particular drives's design point that is determined by the disk's area density required to meet the drive's data storage byte capacity point. The disk's data recording surface has been traditionally allocated to include: an outer guard band, a data zone, and an inner guard band. The physical act of placing the head over the required track for performing the read and write operations is not done with 100% accuracy. The drive crash stop tolerances are very large and impact the reliability of the drive. The head positioning dilemma has been traditionally resolved by including extra tracks in the disk's inner guard band, essentially widening the landing zone, see FIG. 1. By example, a 1.35 gigabyte disk drive may have a minimum track spacing that results in a nominal track design of 5100 tracks for all 1.35 gigabyte drives. From this nominal design information, each disk would be allocated an outer guard band having 84 tracks, a data zone having 4923 tracks and a landing zone of 93 tracks, see FIG. 2. From this design information, a corresponding nominal track width of 196 micro-inches would impact a 170 micro-inch wide write head as shown in FIG. 3. If a disk is determined to have extra spacing for additional tracks, the extra tracks would be allocated to the inner guard band. The disk's data real estate is sacrificed to improve reliability, rather than risk having too few tracks in the inner guard band and allow the read/write heads to land on data. The extra tracks on the disk go unused by the drive, which effectively results in decreasing the drive's read, write and servo margins and further results in a higher than needed tracks per inch. To applicant's knowledge, a method for determining and optimizing a disk's tracks per inch spacing which defines the disk area that can be used for writing data on a disk has not been taught by the prior art. To applicant's knowledge, the prior art has used a predetermined bounded distance for determining the number of tracks per inch available for writing data, even though the disk may have extra tracks which could be used for storing data.

Thus, a need is seen to exist for a disk drive having a data storage disk adapted with optimized tracks per inch spacing that is facilitated by a method for determining a disk's area and associated radial distance that can be used for writing data and establishing from the determined radial distance the disk's actual tracks per inch (tpi) spacing that can be used for writing data and using the determined tracks spacing on that disk for writing data.

It is therefore a primary object of the present invention to provide a disk drive having a data storage magnetic disk adapted with optimized tracks per inch spacing that is facilitated by a method that includes determining the disk's spacing and associated radial distance that can be used for writing data and establishing from the determined radial distance the disk's actual tracks per inch (tpi) spacing, or track width, that can be used for writing data and using the determined track width on that disk for storing data.

DISCLOSURE OF INVENTION

Accordingly, the foregoing primary object is accomplished by providing a disk drive apparatus having data storage magnetic disks that have undergone a manufacturing method where the disks have been manipulated, such as at a servowriting station, where, by example, a laser is utilized to accurately measure the distance (to a micro-inch accuracy) from an inner diameter head crash stop region (ics) to the outer diameter head crash stop (ocs) region. The measurement is used to determine whether there is any extra disk space in the measured region that can be divided among the data tracks to effectively decrease a previously bounded nominal tracks per inch (tpi) spacing and a corresponding nominal track width. The finding of extra space results in servo writing the tracks in the data zone at a wider spacing and in a distribution of tracks at a lesser track density per unit length, by example, at a lesser tracks per inch density.

The measured distance varies from disk to disk, and is generally greater (typically greater by 1%–6%) than a nominal distance established for the disk drive product population in general. The minimum spacing requirement is the spacing required for the outer guard band, the data zone and the landing zone for a particular disk drive's design. The disk drive design minimum spacing requirement is based on factoring tolerances for a population of disk drives of the same model having similar read/write head elements and other componentry. The minimum spacing requirements further factors a disk drive's capacity, dimensional tolerances on the width of the head and the actual read/write element, as well as the off-track following characteristics of the drive. Thus, the present invention will adaptively control the track pitch for each drive by accurately determining whether there is any extra disk space on the disk that is above and beyond the nominal design track spacing that can be divided among the data zone tracks to effectively decrease a previously bounded nominal tracks per inch (tpi) spacing.

Other features of the present invention are disclosed or apparent in the section entitled: "BEST MODE FOR CARRYING OUT THE INVENTION."

BRIEF DESCRIPTION OF DRAWINGS

For fuller understanding of the present invention, reference is made to the accompanying drawing in the following detailed description of the Best Mode of Carrying Out the Present Invention. In the drawing.

Figure 1:
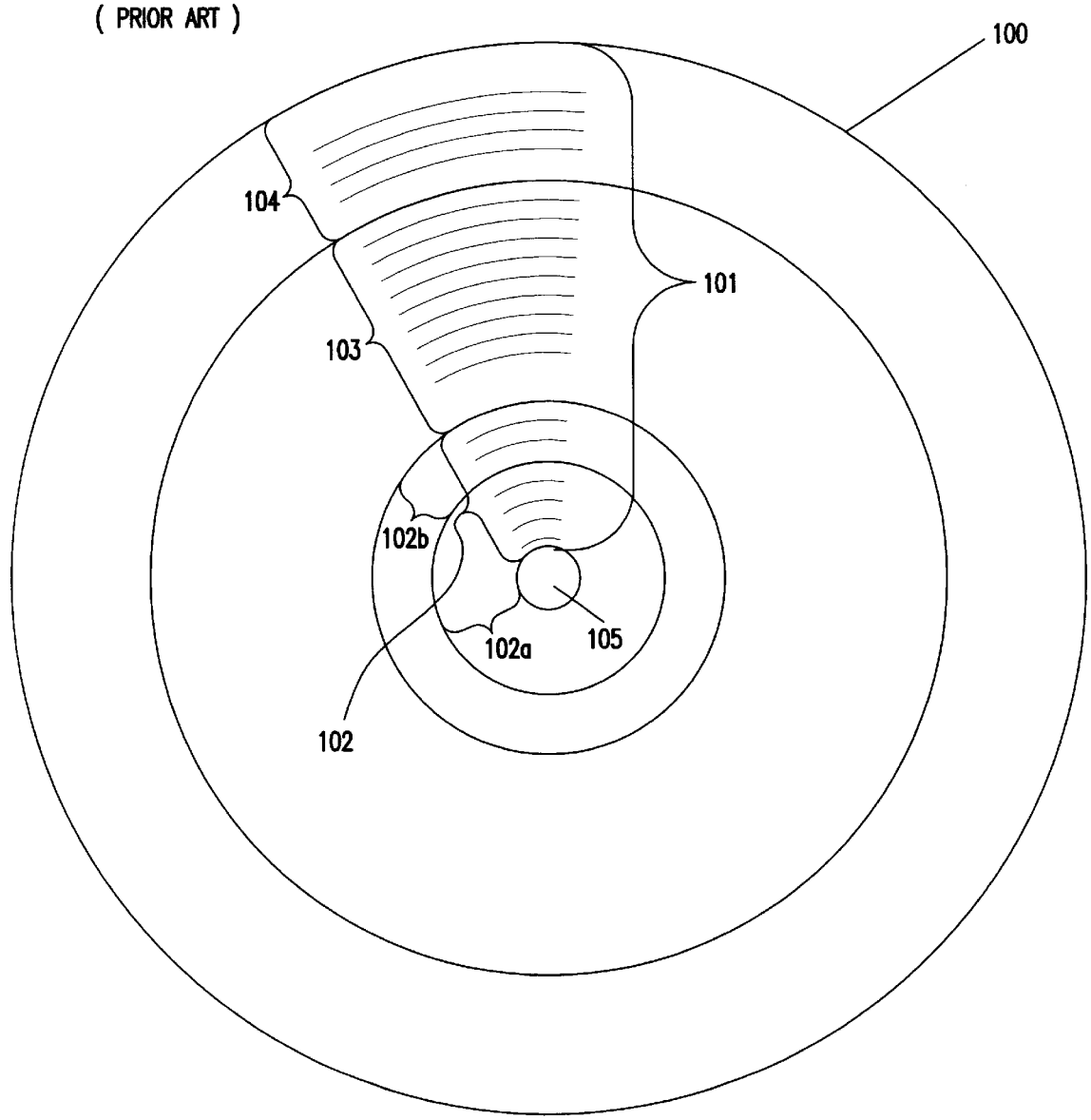
FIG. 1 is a graphical illustration of a magnetic disk used in disk drives showing the prior art allocation of disk tracks that includes the allocation of extra tracks in the inner guard band to maintain drive reliability due to drive crash stop tolerances.

Reference numbers refer to the same or equivalent parts of the present invention throughout the several figures of the drawing.

BEST MODE FOR CARRYING OUT THE INVENTION

Figure 2:
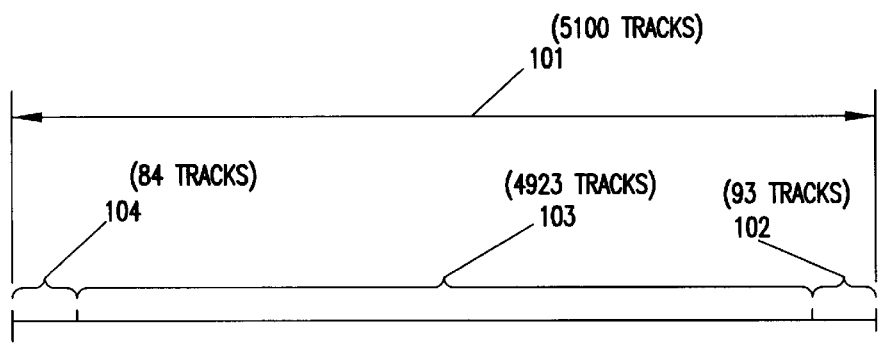
FIG. 2 is a graphical illustration of a magnetic disk's track distribution according to the prior art's use of fixed track spacing that is based on a nominal drive design point used on all drives to maintain drive reliability due to drive crash stop tolerances.
Figure 3:
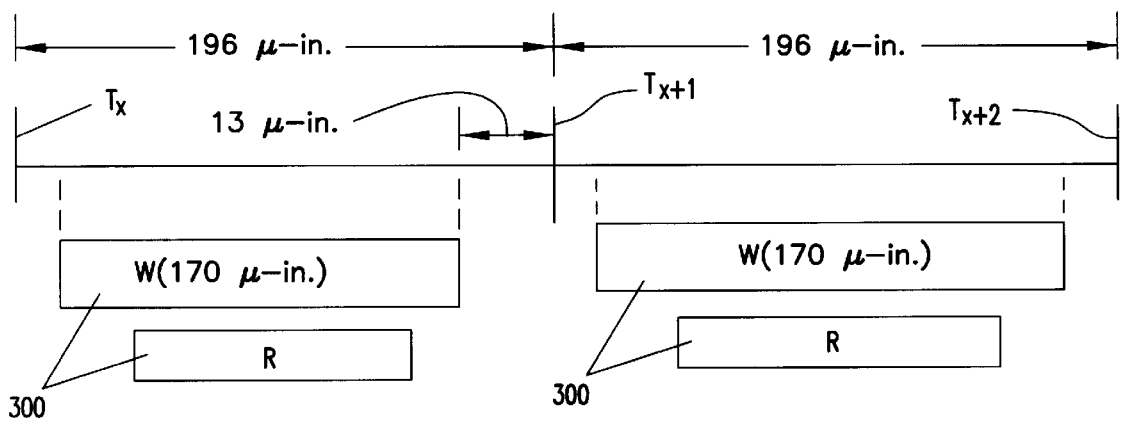
FIG. 3 is a graphical illustration of a disk drive's read write head positioned over disk tracks that have been servo written at a nominal track width that corresponds to a track pitch that is determined according to the prior art's use of fixed track spacing associated with a nominal drive design point.

As briefly discussed above and as FIG. 1 shows, the prior art teaches that a magnetic disk 100 is typically provided having a track distribution 101 comprising an inner guard band 102, a data zone 103, and an outer guard band 104. A mounting means 105 is provided centrally located on the magnetic disk 100 for attachment to the disk drive's spindle motor. FIG. 1 further shows that inner guard band 102 is ample in space, and includes a landing zone 102a and extra tracks 102b. As discussed previously, extra tracks 102b are provided as a means of managing positioning accuracies associated with drive head crash stop tolerances that impact the reliability of the drive. Data zone 103 in each of the disk drive's magnetic disk is critical in establishing the capacity of the drive. As stated previously, a disk drive product development efforts include the establishment of nominal track distributions and corresponding nominal track-to-track widths and track density, typically specified in micro-inches and tracks per inch, respectively. FIG. 2 shows, by example, a nominal track distribution 101 that comprises 5100 tracks where the inner guard band 102 is allocated 93 tracks, data zone 103 is allocated 4923 tracks and outer guard band 104 is allocated 84 tracks. It is worthwhile noting that the prior art track distribution 101 is based on linear spacing according to a nominal drive design information that is used on all drives to maintain drive reliability due to drive crash stop tolerances, regardless of whether the actual magnetic disk linear spacing is greater. The nominal design constraint is further exemplified in FIG. 3 where a disk drive's read (R)/ write (W) head 300 is sequentially positioned over disk tracks Tx, Tx+1, and Tx+2. As illustrated, read/write head 300 has a head width of 170 micro-inches and ideally is positioned over and between tracks that have been servo-written having a track-to-track width of 196 micro-inches based on a track pitch of 5100 tracks per inch. Dimensionally, the read, write, and servo margins that result from the foregoing arrangement is 13 micro-inches on each side of read/write head 300, assuming that read/write head 300 is centrally positioned between the tracks.

Figure 4:
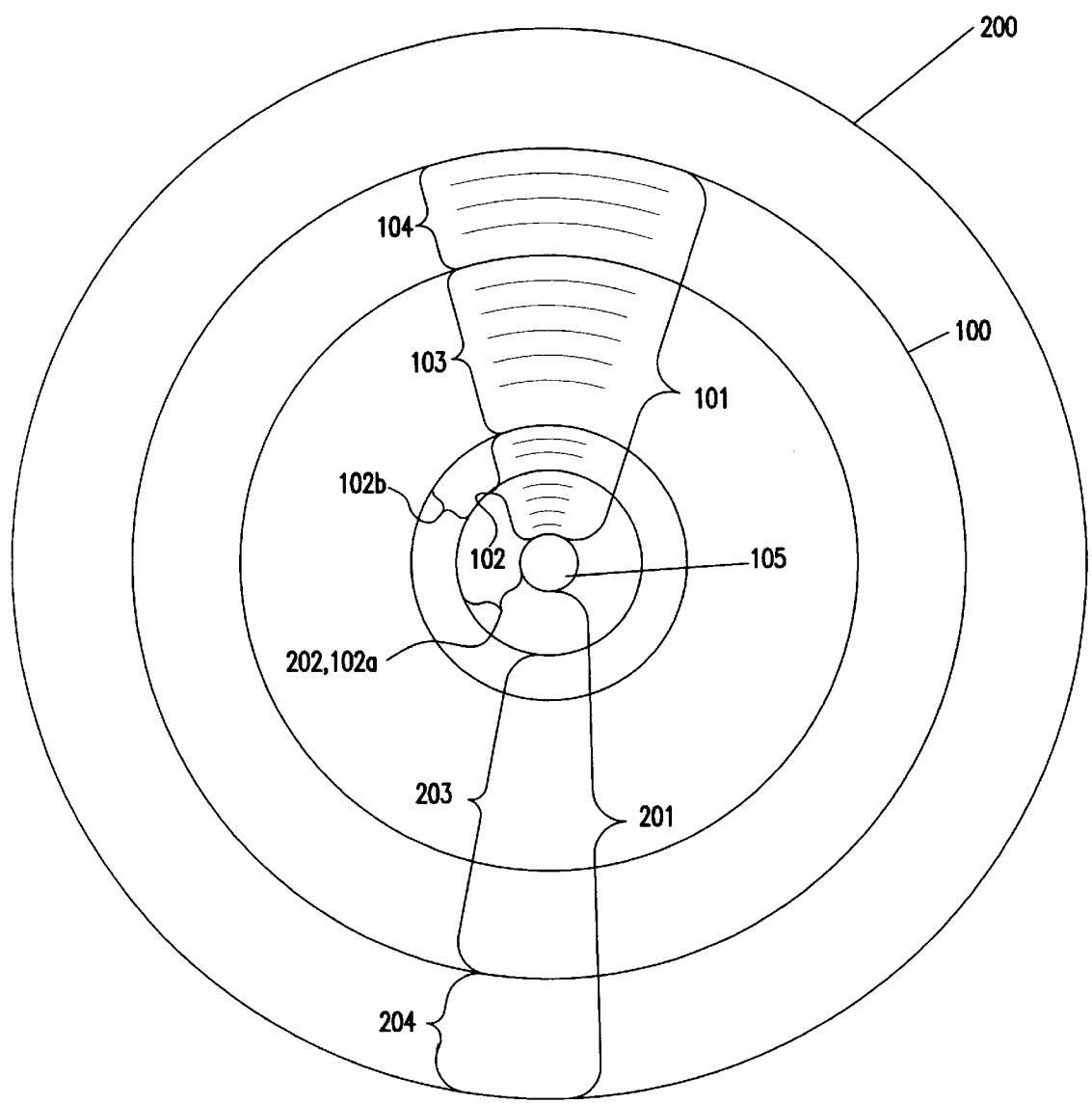
FIG. 4 is a graphical illustration of a magnetic disk used in disk drives showing the allocation of disk tracks in accordance with the present invention that now includes adaptive allocation of extra tracks to the data zone track area.

In accordance with the present invention, during a manufacturing process of building a disk drive, and preferably at a servo write station, a measuring instrument determines an actual distance from an inner diameter head crash stop region (ics) to the outer diameter head crash stop (ocs) region, i.e. the data zone region depicted by numeral 203 in FIG. 4. The measurement is preferably performed using a laser to obtain a high degree of accuracy, preferably to a micro-inch accuracy. The servo writer station comprises a computational means in addition to servo writing means. The computational means compares stored nominal design track density information versus actual measurement of region 203 to determine whether there is any extra disk space in the measured region that can be divided among the data tracks in the nominal track distribution 101 to effectively decrease the actual track density of the disk and effectively increase the usable space depicted as data zone 103. FIG. 4 shows, by a not-to-scale example, magnetic disk 100 having been processed in accordance with the manufacturing process of the present invention to effectively realize a larger track distribution region 201 that comprises a nonnominal dimension based magnetic disk 200. The difference between disk 100 shown in FIG. 1 and disk 200 shown in FIG. 4 is that by actual measurement the extra space 102b that was allocated to inner guard band 102 is now allocated to data zone 203. It should be noted that inner guard band 202 in FIG. 4 comprises the same quantity of tracks as in landing zone 102a. The difference being that the tracks in the region 202, 102a in FIG. 4 are spaced apart, and servo written, at a wider distance than the tracks in region 102a in FIG. 1. Similarly, outer guard band region 204 comprises the same quantity of tracks as in outer guard band 104 but differs in that the tracks in region 204 in FIG. 4 are spaced apart at a wider distance than the tracks in region 104 as shown in FIG. 1. It should also be noted that disks 100 and 200 are physically the same disk, but are illustrated as being effectively different only with regards to the treatment of nominal design spacing (disk 100) and actual spacing (disk 200) in accordance with the present invention.

Figure 5:
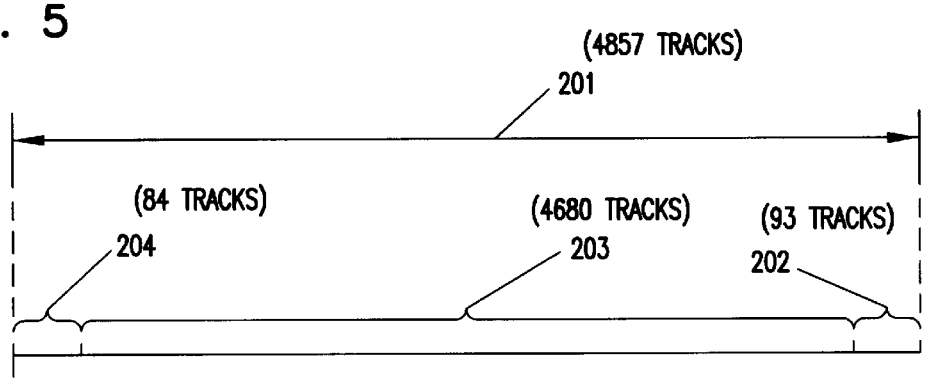
FIG. 5 is a graphical illustration of a magnetic disk's track distribution according to the present invention wherein track spacing for each disk is now adaptively based on the actual distance that is available for servowriting.
Figure 6:
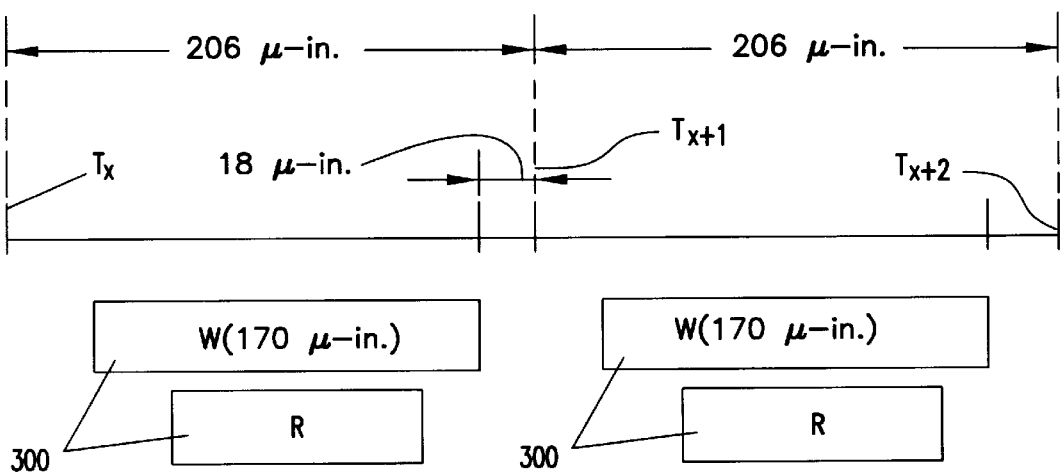
FIG. 6 is a graphical illustration of a disk drive's read write head positioned over disk tracks that have been servo written in accordance with the present invention wherein the track widths are now wider and correspond a track pitch that is based on the actual distance that is available for servowriting.

After determining that a magnetic disk actually comprises additional usable space for data tracks, the computational means divides the extra space among the data zone tracks. It has been determined that the extra space results in track-to-track width increase ranging from 1% to less than 10%. The servo writer, after having revised the dimensional data concerning a particular disk drive being built, then prepares the disk for writing servo information in patterns, typically at the leading end of a data track. FIG. 5 shows, by example, after actual measurement, a magnetic disk track distribution 201 accommodating 4857 tracks instead of 5100 tracks. The 4857 tracks are allocated in the three disk regions resulting in 93 tracks in inner guard band 202, 4680 tracks in data zone 203 and 84 tracks in outer guard band 204. The actual decrease in track density is facilitated because more space is available for placement of data tracks. It should be noted that the decrease in track density does not affect the storage capacity of the disk. Rather, the decrease in track density means that the tracks are not crowded and allows for greater variations in positioning the read/write head over the tracks. Also, it has been found that decreasing the number of tracks in the outer and inner guard bands 202, 204 does not significantly improve the drive's performance. Thus, although bands 202, 204 on the actual disk are actually wider than bands 102, 104, the number of tracks in the respective bands is preferably the same as when employing the high track density. FIG. 6 shows the margin impact of a 5% track width increase for positioning the same 170 micro-inch wide R/W head 300 shown in FIG. 3. As illustrated, a 5% increase, in accordance with the present invention results in tracks Tx, Tx+1, and Tx+2 being spaced apart by 206 micro-inches. The read, write, and servo margins that result from employing the measurement method for determining track density is now 18 micro-inches on each side of read/write head 300, assuming that R/W head 300 is centrally positioned between tracks Tx, Tx+1, and Tx+2. By employing the measurement method of the present invention, each drive would have a track density at most as high as a nominal track density and a track width no narrower than a corresponding nominal track width. The adaptive control of track spacing utilizes all of the disk distance each drive has to increase the disk drive's read, write and servo margins, and thereby also improve build yield which reduces a disk drive's product cost.

The present invention has been particularly shown and described with respect to certain preferred embodiments and features thereof. However, it should be readily apparent to those of ordinary skill in the art that various changes and modifications in form and detail may be made without departing from the spirit and scope of the inventions as set forth in the appended claims. The inventions illustratively disclosed herein may be practiced without any element which is not specifically disclosed herein.

I claim:

1. A method for controlling track density comprising steps of:
   (a) providing a magnetic disk storage member having an annular surface for writing several data tracks, each surface having an actual radial width;
   (b) retrieving data corresponding to a predetermined nominal design track width of the magnetic disk storage member;
   (c) measuring the actual radial width of the annular surface;
   (d) manipulating the measured actual width with the retrieved data to determine a greater-than-nominal track width; and
   (e) writing data onto the magnetic disk storage member utilizing the greater-than-nominal track width.

2. A method for controlling track density according to claim 1 further comprising a step of:
   performing operational tests having increased product defect margins on the magnetic disk storage member, the increased product defect margins being attributable to said greater track width.

3. A method for controlling track density according to claim 2 in which the operational tests comprise servo performance tests.

4. A method for controlling track density according to claim 1 in which the greater-than-nominal track width is greater than the predetermined nominal track width by at least 1%.

5. An apparatus configured to perform the method of claim 1.

6. An apparatus configured to perform the method of claim 1 comprising a disk drive containing the magnetic disk storage member, the apparatus further comprising a manufacturing station configured to position the disk drive during step (c).

7. An apparatus for controlling the track density of a magnetic disk storage member having an annular surface for writing several data tracks, each surface having an actual radial width, the apparatus comprising:
   (a) a disk drive containing the magnetic disk storage member;
   (b) a manufacturing station having access to predetermined nominal design track width data pertaining to the magnetic disk storage member, the station configured to position the disk drive and measure the actual radial width of the annular surface, to manipulate the measured radial width and the predetermined data to compute a greater-than-nominal track width, and to write data onto the magnetic disk storage member utilizing the greater-than-nominal track width.

8. An apparatus according to claim 7 in which the annular surface has predetermined nominal design track regions delineating a nominal data storage region and a nominal crash stop region, in which the station comprises a writer configured to write data utilizing the greater-than-nominal track width in the nominal data storage region.

9. An apparatus according to claim 7 in which the annular surface has predetermined nominal design track regions delineating a nominal data storage region and a nominal crash stop region, in which the station comprises a writer configured to write data utilizing the greater-than-nominal track width in the nominal crash stop region.

* * * * *